Patented Mar. 21, 1933

1,902,169

UNITED STATES PATENT OFFICE

WILLY O. HERRMANN AND HANS DEUTSCH, OF MUNICH, GERMANY, ASSIGNORS TO CONSORTIUM FUER ELEKTROCHEMISCHE INDUSTRIE, G. M. B. H., OF MUNICH, GERMANY, A CORPORATION OF GERMANY

PROCESS FOR PRODUCING UNSATURATED ETHERS

No Drawing. Application filed January 29, 1931, Serial No. 512,197, and in Germany February 6, 1930.

This invention relates to a process for producing unsaturated ethers and more particularly to a process of producing unsaturated ethers by splitting off alcohol from acetals of saturated aldehydes by leading acetal vapor over heated catalysts.

An object of this invention is to provide a process of producing unsaturated ethers with an output greater than has been heretofore realized.

Another object of this invention is to prevent secondary reactions, such as result in the formation of saturated ethers and acetaldehyde.

Other objects are to provide an economical process of heating and in which a dilution of the gas according to the known process is unnecessary, the life of the catalyst is increased, and the crude product of the manufacture of acetal may be employed without the cumbersome separation of by-products.

According to this invention, the aldehydes must contain a carbon atom adjacent to the carbonyl group, to which carbon atom is linked at least one hydrogen atom.

The process may be explained by the production of vinylethyl ethers.

By a known process vinylethyl ether is produced by leading vapors of the diethylacetal of acetaldehyde together with a large excess of nitrogen slowly over pieces of clay heated to 250° C. When working in this manner, 9 g. of a product boiling between 35–50° C. are obtained per hour and liter reaction space. The product obtained by this way is by no means pure vinylethyl ether, but the bulk of it is diethyl ether and acetaldehyde formed by a secondary reaction. The disadvantages of this side reaction are numerous because vinylethyl ether and diethyl ether can not be separated by fractional distillation.

Now we have found that the efficiency of the reaction is surprisingly increased by driving much more than 25 g. of the vapors of acetals through one liter of the reaction space per hour. By this manner the formation of vinylethyl ethers is favorably influenced, secondary reactions being prevented, and the conversion is largely increased, the yield becoming nearly quantitative.

By driving through the apparatus a moderately larger amount of vapors, the advantages of the new process are realized. But they are enlarged in a most surprising manner by driving up to several kilograms of acetals through one liter of reaction space per hour.

A further advantage resulting from this manner of working is the possibility of using higher reaction temperatures without diminishing the output. The greater velocity of the vapors prevents local overheating. Besides, when heating the vapors for a short time to higher temperatures, the catalysts will cause less harm to the reaction components than when heating said vapors for a prolonged time to lower temperatures. By the use of higher temperatures, the formation of vinylethyl ethers is still more favorably influenced.

When working with a large amount of vapors, the vapors of acetals may be preheated with good results, and heating of the reaction room results, partly on account of the preheating, or may even be dispensed with. The efficiency is also increased, while the danger of overheating is further diminished or completely avoided.

When working with large amounts of vapors, the process may be well carried out without or with the addition of neutral gases. By avoiding the addition of neutral gases, the manner of working is simplified, the costs of heating the added gases are saved and the conditions of the reaction are improved. Furthermore the reaction vapors are condensed more easily.

We have further discovered that certain catalysts are more effective and of a more homogeneous action than pure clay. By such catalysts the formation of vinyl ether is surprisingly increased without any decrease of yield. The secondary reactions, especially the formation of acetaldehyde and diethyl ether, are greatly diminished, while the favorable temperature of working is lowered a considerable amount.

We have found that there are surprisingly large number of catalysts. Such catalysts are not only the different kinds of burnt clay but all the elements, oxides and salts which are difficultly or not volatile at temperatures under 400° C. Such catalysts are also the different kinds of activated carbons. Several of these substances are only effective under the favorable conditions of speed and temperatures described above, but others are more effective than pure clay without any variation of the conditions of working.

Substances with a large binding power for cations are especially effective catalysts in themselves or combined with the activators hereinafter described. Such substances are characterized by the ability of binding metallic ions, for instance copper ions from solutions of copper salts in a chemical or physical, interchangeable or not interchangeable manner. Substances of this kind are for instance fuller's earth, several kinds of brick clays, activated carbon, silica gel, asbestos, and feldspars.

They are to be found in different classes of minerals and as organic and inorganic compounds, combining a sufficient thermal stability with high adsorbing power. Examples of such are substances known as base exchange compounds, especially the aluminate-silicates as natural and artificial zeolites and the base exchange compounds which are not silicates as the sodium-borates of aluminia and magnesia, mixed cuprates, stannates, plumbates, aluminates, vanadates, wolframates, molybdates, titanates, chromates and so on. These substances may be combined in a great variety of combinations.

These substrates for catalysts may be further modified and strengthened by introducing metallic ions into them for instance those of copper, silver, zinc, mercury, iron, aluminia, lead, tin and so on.

Effective catalysts are also formed by combining cation binding substances with free metals. Such metals are for instance copper, silver, calcium, magnesium, zinc, cadmium, aluminium, bismuth, chromium, tungsten, manganese, iron, nickel, and cobalt. The metals may be used as carriers for the catalysts in the form of coarse grains or of shreds. They may also be mixed with the other components in a finely dispersed form.

The efficiency of all these catalysts can be further increased by combining them with one or several anion forming oxides of the first seven groups of the periodical system. The oxides or hydroxides can be used in the free state or in the form of salts. Silicic acids, boric acids, phosphoric acids, stannic acids and their neutral, acid or basic salts or mixtures of them are especially suitable.

The combination of the catalysts with the activating substances may be effected by impregnating them with suitable solutions and drying. Pressing and forming or sintering or melting may also be used. The following examples indicate the solution, quantity and application of activators for the different kinds of substrates, but also a large number of other combinations may be used. In combining the catalysts and activating substances, catalysts should be selected according to their chemical composition, and basic and acid action. Kieselguhr, fuller's earth, finely dispersed carbon may be added to the catalysts to make them more porous.

The process illustrated above in the example of splitting acetaldehyde-diethylacetal may also be employed with the other acetals of acetaldehyde.

The process can also be carried out with the acetals of all other aldehydes which have linked to the carbon atom adjacent to the carbonyl group at least one atom of hydrogen.

By the described process, for instance, the following unsaturated ethers can be advantageously produced:

1,2 butenylethyl ether from the diethyl acetal of butyraldehyde; 1,2 butenylbutyl ether from the dibutyl acetal of butyraldehyde; $\beta$-methoxystyrol from the dimethyl acetal of phenylacetaldehyde.

We have further found, that in the process described above, the crude products of the manufacture of acetals containing acetal, alcohol, aldehyde and water can be used. This mixture may be used in the original state or after simply driving off the bulk of the aldehyde. Such a proceeding is especially suitable when starting from the lower acetals of acetaldehyde because the isolation of those acetals is difficult and expensive.

*Example I*

A tube containing one liter of grains of burned clay is heated to 280–320° C. and 200 g. diethyl acetal of acetaldehyde are led through in the vapor phase. By condensation 99% of the original weight of material was recovered. By fractionating, 58 g. of a product boiling under 50° C. were obtained per hour of working, containing 19.2% vinylethyl ether. That is a production of 11.2 g. pure vinyl ether per hour.

*Example II*

The same reaction room and catalyst as in the foregoing example were used but 1200 g. of the vapor of diethyl acetal were driven through the tube at the higher temperature of 430-450° C. 98% of the material was recovered. Per hour 233 g. of a fraction boiling under 50° C. containing 22.2% vinylethyl ether were obtained. 52 g. of pure vinyl ether were gained per hour.

Example III

A reaction tube was filled with one liter of grains of brick containing a high percentage of iron. The brick absorbed a good deal of copper from a solution of copper salt but was not able to interchange bases. Through 1 liter of the catalyst at a temperature of 430-450° C. 1200 g. of the vapors of diethyl acetal were driven per hour. 434 g. of a fraction boiling under 50° C. were obtained containing about 40% of vinylethyl ether. 159 g. of pure vinylethyl ether were generated per hour.

Example IV

Through one liter of grained sodium chabasite 1200 g. of the vapors of diethyl acetal were driven per hour at a temperature of 430-450° C. 98% of the original weight of the material was recovered. 606 g. of a fraction boiling under 50° C. was obtained containing 30-40% of vinylethyl ether. 179 g. of pure vinylethyl ether were generated per hour.

Example V

An artificial aluminate-silicate of sodium capable of interchanging a great amount of bases was used as catalyst. Through one liter of this catalyst at a temperature of 380-400° C. 1200 g. of the vapors of diethyl acetal were driven per hour. 99.5% of the original weight of the material was recovered. 603 g. of a fraction boiling under 50° C. were obtained containing 30-35% vinylethyl ether. 187 g. of pure vinylethyl ether were obtained per hour.

Example VI

A paste was made from 2300 parts by weight of the catalyst used in the foregoing example and 650 parts by weight of a solution of water glass. The water glass contained 10.6% of bound and 0.73% of free alkali. The paste was dried under pressure at a temperature of 100 to 130° C. and grained. Under the conditions described in Example V 320 g. of vinylethyl ether were obtained per hour. In the first distillation, the vinylethyl ether was obtained in a concentration of 67%, while 99% of the original weight of the material was recovered.

Example VII

Through one liter of the catalyst described in Example VI 2400 g. of the vapors of diethyl acetal were driven per hour at a temperature of 390-400° C. 98% of the original weight of the material was recovered. 616 g. of vinylethyl ether were obtained per hour with an average concentration of 65%.

Example VIII 2300 parts by weight of the catalyst used in Example V were converted into an aluminate-silicate of iron by treating the catalyst with a solution containing 5% of iron chloride. The product was then impregnated with 715 parts by weight of the water glass solution described in Example VI and dried. Through one liter of this catalyst 1800 g. diethylacetal were driven per hour at a temperature of 300-320° C. 363 g. of vinylethyl ether in concentration from 67 to 70% were obtained.

The experiment was continued at a temperature of 380-400° C. 447 g. of vinylethyl ether in a concentration of about 72% were obtained.

Example IX 2300 parts by weight of the aluminate-silicate of sodium used in Example V were calcined with 200 parts by weight of borax and then impregnated with 650 parts by weight of the water glass solution described in Example VI. The catalyst was dried at a temperature of 120-150° C. and grained. Through one liter of this catalyst 1200 g. diethyl acetal in the vapor phase were driven per hour at a temperature of 340-350° C. 355 g. vinylethyl ether were obtained per hour. In the first distillation, the bulk of the product was obtained in a concentration of 90.5% containing only 2.2% of acetaldehyde.

Example X 3220 parts by weight of ground siliceous calamine were mixed with 715 parts by weight of the water glass solution described in Example V. The product was dried and grained. One liter of this catalyst was used and 1200 g. diethyl acetal were driven through it per hour at a temperature of 380-400° C. 109 g. of vinylethyl ether in a concentration of about 70% were obtained.

Example XI 1390 parts by weight of the brick used in Example III were ground and calcined with 300 parts of boric acid. Through one liter of the grained catalyst 1200 g. diethyl acetal in the vapor phase were driven per hour at 450-470°. 98.6% of the original weight of the material was obtained. 332 g. of vinylethyl ether were obtained in a concentration of about 75%.

Example XII 970 parts by weight of fuller's earth were calcinated with 300 parts by weight of boric acid. Through one liter of this catalyst 1200 g. of the vapors of diethyl acetal were driven per hour at a temperature of 370–400° C. 505 g. of vinylethyl ether were obtained per hour corresponding to a conversion of 70.3% of the theoretical amount. The product was obtained in the first distillation in a concentration of 68% containing only 1.6% of acetaldehyde. 98.5% of the original weight of the material was recovered.

Example XIII 2130 parts by weight of sodium feldspar were ground and sintered with 500 parts by weight of borax. Through one liter of the grained catalyst 1200 g. diethyl acetal were driven at a temperature of 450–470° C. 511 g. vinylethyl ether per hour being formed. The bulk was obtained in the first distillation in a concentration of 84%. 99% of the original weight of the material was recovered. The conversion into vinylethyl ether amounted to 71.1%.

Example XIV 1310 parts by weight of ground asbestos were calcined with 500 parts of borax. Through one liter of the catalyst thus obtained 1200 g. of diethyl acetal were driven per hour at a temperature of 360–400° C., 388 g. vinylethyl ether per hour being thus obtained. The bulk was obtained in the first distillation in a concentration of 94.1% of vinylethyl ether, containing only 1.4% acetaldehyde.

Example XV 1310 parts by weight of ground asbestos were calcinated with 300 parts by weight of boric acid. By the use of this catalyst according to Example XIV but at temperatures of 330–350° C., 572 g. of vinylethyl ether were generated per hour. The bulk of it was obtained in the first distillation in a concentration to 91%. The conversion of vinylethyl ether amounted to 79.5% of the theoretical amount. 98% of the original weight of the material was recovered.

Example XVI

The experiment described in the foregoing example was repeated while driving through the apparatus 2400 g. of acetal vapors at a temperature between 320 and 360° C. 1090 g. vinylethyl ether were obtained per hour. 98.9% of the original weight of material was recovered. Because of the large quantity of vapors driven through the apparatus the deficiency in heat was so large that the temperature of the apparatus must be increased balanced by external heating.

Example XVII

A preheater was mounted before the reaction furnace used in the foregoing example. The vapors of acetal were preheated to a temperature of 450–500°. By means of this disposition 3600 g. of acetal vapors per hour could be driven through the apparatus. 1540 g. of vinylethyl ether were formed per hour. 99% of the original weight of the material was recovered.

Example XVIII 1310 g. of ground asbestos were calcined with 300 g. phosphoric acid. 1200 g. vapors of diethyl acetal were driven per hour through one liter of this catalyst at a temperature of 360–375° C., 517 g., of vinylethyl ether being generated per hour.

Example XIX 1000 parts by weight of aluminia were calcined with 2400 parts by weight of borax. About 1200 g. of diethyl acetal vapors per hour were sent through one liter of this catalyst at a temperature of 450–470° C., 298 g. vinylethyl ether being formed. 99% of the original weight of material was recovered. The bulk was obtained in the first distillation in a concentration of 69%.

Example XX

One liter of activated carbon was impregnated with a solution of 300 g. of borax and 100 g. of boric acid in water and dried. Through this catalyst 1200 g. diethyl acetal vapors per hour were driven at temperatures between 330–360° C. 478 g. vinylethyl ether were obtained per hour. 99% of the original weight of material was recovered.

Example XXI 2070 parts by weight of silicon were sintered with 500 parts by weight of borax. Through one liter of the catalyst thus obtained about 1200 g. diethyl acetal vapors per hour were driven at temperatures between 440 and 460° C. 279 g. vinylethyl ether were obtained. 99% of the original weight of material was recovered.

Example XXII 2000 parts by weight of zinc dust were thoroughly mixed with a finely grounded mixture of 2000 parts by weight of the sodium aluminate-silicate used in Example V and 200 parts by weight of highly active carbon. A paste of this mixture with 1300 parts by weight of a solution of water glass was dried under a slight pressure and grained. Through one liter of this catalyst about 1200 g. diethyl acetal vapors were driven per hour at temperatures between 360 and 400° C., 346 g. of vinylethyl ether being formed. 99% of the original weight of material was recovered.

Example XXIII

Through one liter of the catalyst described in Example XV 1200 g. dibutyl acetal of acetaldehyde per hour were led in the vapor state at a temperature between 380 and 410°.

440 g. vinylbutyl ether were formed per hour. 99.4% of the original weight of material was recovered. In the first distillation a fraction boiling between 90 and 93° C. was obtained containing 75% of the vinyl ether.

*Example XXIV*

Through one liter of the catalyst described in Example XV 1200 g. di-isoamyl acetal of acetaldehyde were driven per hour in the vapor state at temperatures between 450 and 480° C. 370 g. of vinyl-isoamyl ether were formed. The bulk of the product boiled between 105 and 110° C. 99% of the original weight of material was recovered.

*Example XXV*

Through one liter of the catalyst described in Example XV 1200 g. n-dibutyl acetal of n-butyraldehyde were driven per hour in the vapor state at temperatures between 370 and 390° C. 308 g. of ethylvinyl-butyl ether were obtained. The bulk of the product boiled between 139 and 140° C., containing 71% of the unsaturated ether. 99% of the original weight of the material was recovered.

*Example XXVI*

A mixture of two parts by weight of ethanol and one part by weight of acetaldehyde was converted into acetal by the known process. From the product of reaction only the bulk of the acetaldehyde was driven off and the crude mixture containing 56% acetal and 1.1% acetaldehyde was used for the manufacture of vinylethyl ether according to Example XVII. 5.2 kg. per hour of the mixture preheated to 400–450° C. were driven through the apparatus at a temperature of 320–360° C. 1280 g. vinyl-ethyl ether were formed per hour and liter reaction space.

In connection with our invention and the various examples given we wish to be understood that we do not confine ourselves to all the precise proportions or to the details herein set forth by way of illustration, as modifications and variations may be made as conditions may require or it may be deemed desirable, for example variations of the temperatures, the speed of the vapors of acetals driven through the apparatus, the per cent content of acetal and impurities in the starting products, the kind of the catalyst and so on are possible. Especially the quantity of pure or crude acetal driven through the apparatus per hour and liter reaction space depends upon the size and the cross section of the apparatus, the size of the grains of the catalyst, the friction resistance and the thermal permeability of the materials, the specific heat and the heat of evaporation of the reaction components. The quantity to be driven through the apparatus can be further increased by purposely selecting the isolation and the heating system. Especially important is the efficiency of the preheater. Therefore it is possible to drive much larger quantities of acetal per hour and liter reaction space through the catalyst than described in the examples, for instance 10 kg. and more, thus still further increasing the efficiency and the advantages of the process. The object of the invention is to drive per hour and liter reaction space through the catalyst a quantity of acetals or acetal containing mixtures between 200 g. and the largest amount that can be driven through the apparatus, the quantity being as high as possible. The suitable selection and disposition of apparatus is a mere matter of the art.

What we claim is:

1. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated catalysts which are substantially non-volatile below 400° C. and which are capable of assisting in the splitting off of alcohol from said acetal.

2. Process for producing unsaturated ethers from the vapors of acetals of saturated aldehydes containing a carbon atom adjacent to the carbonyl group, to which carbon atom is linked at least one hydrogen atom, comprising preheating the acetal vapors up to 500° C. and passing said vapors, at a velocity of at least 200 grams per liter of reaction space and per hour at temperatures between 250 and 500° C., over heated metal compound catalysts which are substantially non-volatile below 400° C. and which are capable of assisting in the splitting off of alcohol from said acetal.

3. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated metal compound catalysts which are substantially non-volatile below 400° C., which are capable of assisting in the splitting off of alcohol from said acetal and which have a large combining power for cations.

4. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated metal compound catalysts selected from the group consisting of fuller's earth, burnt brick clays, silica gel, asbestos, feldspars and analogous minerals, zeolites, natural and artificial aluminate-silicates and non-siliceous base exchange compounds.

5. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated metal compound catalysts selected from the group consisting of fuller's earth, burnt brick clay, silica gel, asbestos, feldspars and analogous minerals, zeolites, natural and artificial aluminate-silicates and non-siliceous base exchange compounds, said catalysts having been activated by combination with a member selected from the group consisting of the oxides of the elements of the first seven groups of the periodic system capable of forming anions, and the metal salts of such oxides.

6. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated metal compound catalysts selected from the group consisting of fuller's earth, burnt brick clays, silica gel, asbestos, feldspars and analogous minerals, zeolites, natural and artificial aluminate-silicates and non-siliceous base exchange compounds, said catalysts having been activated by combination with an activator selected from the group consisting of boric acids, silicic acids, phosphoric acids and the metal salts of such acids.

7. Process for producing unsaturated ethers from the vapors of acetals of saturated aldehyde containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C. over asbestos.

8. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C. over asbestos calcined with boric acid.

9. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated metal compound catalysts selected from the group consisting of fuller's earth, burnt brick clays, silica gel, asbestos, feldspars and analogous minerals, zeolites, natural and artificial aluminate-silicates and non-siliceous base exchange compounds, which have been treated with a solution of salts.

10. Process for producing unsaturated ethers from the vapors of acetals of saturated aldehydes containing a carbon atom adjacent to the carbonyl group, to which carbon atom is linked at least one hydrogen atom, comprising passing said vapors, at a velocity of at least 200 grams per liter of reaction space and per hour at temperatures between 250 and 500° C., over heated metal compound catalysts selected from the group consisting of fuller's earth, burnt brick clays, silica gel, asbestos, feldsparts and analogous minerals, zeolites, natural and artificial aluminate-silicates and non-siliceous base exchange compounds, which have been combined with metals.

11. Process for producing unsaturated ethers from the crude reaction product of the manufacture of acetals of saturated aldehydes containing a carbon atom adjacent to the carbonyl group, to which carbon atom is linked at least one hydrogen atom, comprising passing said crude reaction vapors, at a velocity of at least 200 grams per liter of reaction space and per hour at temperatures between 250 and 500° C., over heated metal compound catalysts selected from the group consisting of fuller's earth, burnt brick clays, silica gel, asbestos, feldspars and analogous minerals, zeolites, natural and artificial aluminate-silicates and non-siliceous base exchange compounds.

12. Process for producing unsaturated ethers from the crude reaction product of the manufacture of acetals of saturated aldehydes containing a carbon atom adjacent to the carbonyl group, to which carbon atom is linked at least one hydrogen atom, comprising passing said vapors, at a velocity of 200 grams per liter of reaction space and per hour at temperatures between 250 and 500° C., over asbestos calcined with boric acid.

13. Process for producing vinylethyl ether comprising preheating the vapors of diethyl acetal of acetaldehyde to between 300 and 450° C., and passing the preheated vapors at a velocity of between 200 grams and 6 kilos per liter of reaction space and per hour at temperatures between 300 and 400° C., over asbestos calcined with boric acid.

14. Process of producing vinylethyl ether from the vapors of the crude reaction product of the manufacture of diethyl acetal of acetaldehyde, comprising preheating said crude reaction vapors to 300 to 450° C., and passing said preheated vapors at a velocity of at least 200 grams per liter of reaction space and per hour at a temperature of 300–400° C. over asbestos calcined with boric acid.

Signed at Munich, in the county of Bavaria and State of Germany, this 17th day of January, A. D. 1931.

WILLY O. HERRMANN.
HANS DEUTSCH.